(12) United States Patent
Wang et al.

(10) Patent No.: US 9,913,027 B2
(45) Date of Patent: Mar. 6, 2018

(54) AUDIO SIGNAL BEAM FORMING

(71) Applicant: Intel Corporation, Santa Clara, CA (US)

(72) Inventors: Jian Wang, Shanghai (CN); Hong W. Wong, Portland, OR (US); Alexander Uan-Zo-Li, Hillsboro, OR (US); Xiaoguo Liang, Shanghai (CN); Huaping Jiang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 10 days.

(21) Appl. No.: 14/434,375

(22) PCT Filed: May 8, 2014

(86) PCT No.: PCT/CN2014/077030
§ 371 (c)(1),
(2) Date: Apr. 8, 2015

(87) PCT Pub. No.: WO2015/168901
PCT Pub. Date: Nov. 12, 2015

(65) Prior Publication Data
US 2016/0249134 A1    Aug. 25, 2016

(51) Int. Cl.
*G06K 9/00* (2006.01)
*H04R 3/00* (2006.01)
*H04M 1/03* (2006.01)

(52) U.S. Cl.
CPC ......... *H04R 3/005* (2013.01); *G06K 9/00255* (2013.01); *H04M 1/03* (2013.01); *H04M 2250/52* (2013.01); *H04R 2410/01* (2013.01); *H04R 2430/23* (2013.01); *H04R 2499/11* (2013.01)

(58) Field of Classification Search
None
See application file for complete search history.

(56) References Cited

U.S. PATENT DOCUMENTS

2012/0155703 A1* 6/2012 Hernandez-Abrego H04R 3/005
382/103
2014/0029761 A1* 1/2014 Maenpaa ............... H04R 3/005
381/92

FOREIGN PATENT DOCUMENTS

| CN | 101278596 A | 10/2008 |
|---|---|---|
| CN | 201639751 U | 11/2010 |
| CN | 102164328 A | 8/2011 |
| CN | 103404169 A | 11/2013 |
| WO | 2013049738 A2 | 4/2013 |

* cited by examiner

*Primary Examiner* — Delomia L Gilliard
(74) *Attorney, Agent, or Firm* — International IP Law Group, P.L.L.C.

(57) ABSTRACT

Techniques for processing audio data are described. An example of a computing device includes a microphone array to generate audio data and a camera. The computing device is to receive video data from the camera and identify a beam forming target based, at least in part, on the video data. The computing device also includes a beam former to process the audio data to aim a beam of the microphone array at the beam forming target.

21 Claims, 7 Drawing Sheets

AUDIO SIGNAL BEAM FORMING

CROSS REFERENECE TO RELATED APPLICATIONS

Pursuant to 35 U.S.C. § 371, this application is the United States National Stage Application of International Patent Application No. PCT/CN2014/077030, filed on May 8, 2014, the contents of which are incorporated by reference as if set forth in their entirety herein.

TECHNICAL FIELD

The present disclosure relates generally to techniques for processing an audio signal to reduce background noise. More specifically, the present techniques relate to processing an audio signal using spatial filtering, also known as beam forming.

BACKGROUND ART

When recording audio, background noise may tend to interfere with the suitable recording of the intended audio source. To reduce background noise, beam forming may be used to amplify the audio signal corresponding with the intended audio source while diminishing background noise.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

The subject matter disclosed herein relates to techniques for processing an audio signal to reduce background noise through beam forming. Beam forming is a technique in which the audio signals received by a microphone array are processed such that sounds received from a particular direction will be amplified compared to sounds received from other directions. The present disclosure describes techniques for using a video image to identify a beam forming target and adjust the directionality of a microphone array accordingly. For example, the user of an electronic device such as a tablet may use the tablet's video display to manually select a beam forming target, such as a person speaking. The directionality of the microphone array may then be adjusted to aim a beam of the microphone array in the direction of the selected beam forming target. In some examples, the video image may be processed using facial recognition to identify a person's face. The person's face may be selected as a beam forming target, either automatically according to code implemented in the electronic device, or manually by the user. Once a beam forming target is identified or selected, the directionality of the microphone array may be continuously adjusted to follow the beam forming target. Various examples of the present techniques are described further below with reference to the Figures.

Figure 1:
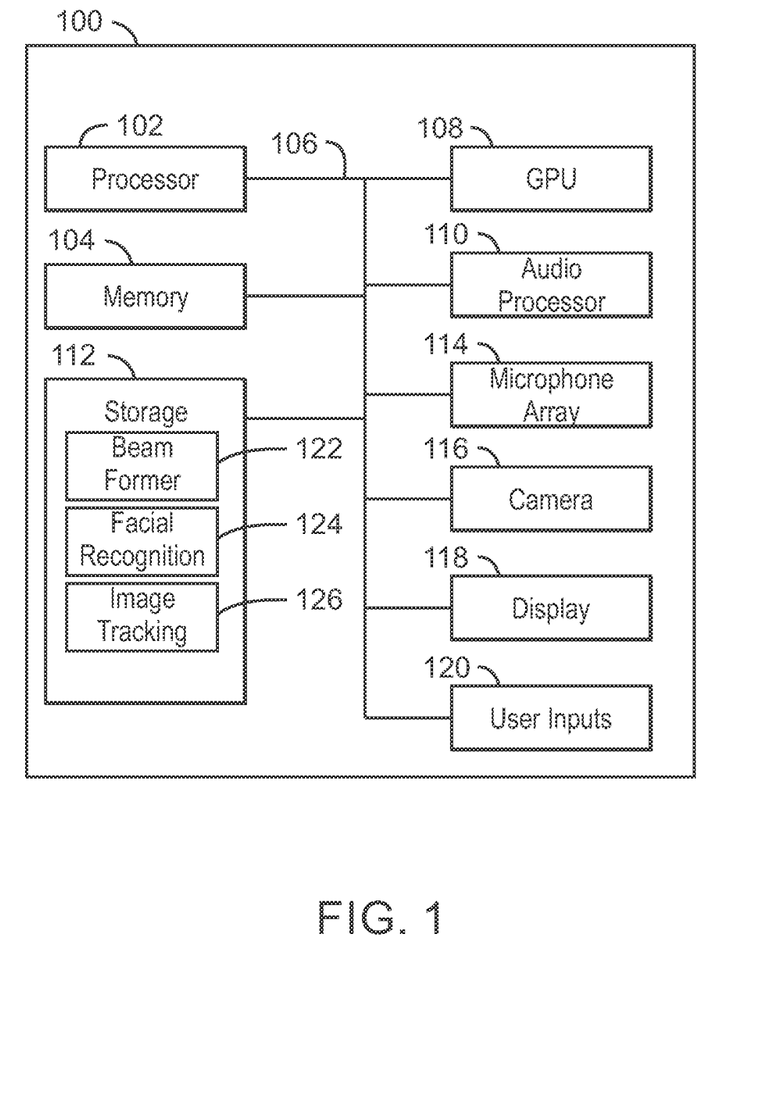
FIG. 1 is a block diagram of a computing device that uses audio signal beam forming.

FIG. 1 is a block diagram of a computing device that uses audio signal beam forming. The computing device 100 may be, for example, a laptop computer, tablet computer, mobile phone, smart phone, or a video recorder, among others. The computing device 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the computing device 100 may include more than one CPU 102. The memory device 104 can include random access memory (RAM), read only memory (ROM), flash memory, or any other suitable memory systems. For example, the memory device 104 may include dynamic random access memory (DRAM).

The computing device 100 may also include a graphics processing unit (GPU) 108. As shown, the CPU 102 may be coupled through the bus 106 to the GPU 108. The GPU 108 may be configured to perform any number of graphics operations within the computing device 100. For example, the GPU 108 may be configured to render or manipulate graphics images, graphics frames, videos, or the like, to be displayed to a user of the computing device 100.

The computing device can also include an audio processing device 110. The audio processing device can be configured to perform any number of audio processing operations, such as encoding or decoding audio data, retrieving audio files for rendering the audio on a sound system of the computing device 100, audio equalization, and any other audio processing.

The computing device 100 can also include a storage device 112. The storage device 112 is a physical memory such as a hard drive, an optical drive, a flash drive, an array of drives, or any combinations thereof. The storage device 112 can store user data, such as audio files, video files, audio/video files, and picture files, among others. The storage device 112 can also store programming code such as device drivers, software applications, operating systems, and the like. The programming code stored to the storage device 112 may be executed by the CPU 102, GPU 108, audio processor 110, or any other processors that may be included in the computing device 100.

The computing device also includes a microphone array 114 for capturing audio and a camera 116 for capturing still pictures or video. The microphone array 114 can include any suitable number of microphones, including two, three, four, five microphones or more. The microphone array 114 and the camera 116 can be used together to capture synchronized audio/video data, which may be stored to the storage device 112 as audio/video files or rendered on a display 118. The computing device 100 can also include one or more user input device 120, such as switches, buttons, a keyboard, a mouse, or trackball, among others. One of the input devices may be a touchscreen, which may be integrated with the display 118. The input devices 120 may be built-in components of the computing device 100, or may be devices that are externally connected to the computing device 100.

The programming code stored to the storage device 112 may include a beam former 122, a facial recognition module 124, and an image tracking module 126. In some examples, rather than being implemented as programming code stored to the storage device 112, one or more of the beam former 122, the facial recognition module 124, and the image tracking module 126 may be implemented as firmware or logic circuits included in a dedicated processor such as the graphics processor 108 or audio processor 110.

The beam former 122 controls the directionality of the microphone array 114 by receiving audio signals from individual microphones of the microphone array 114 and processing the audio signals in such a way as to amplify certain components of the audio signal based on the relative position of the corresponding sound source relative to the microphone array 114. For example, the directionality of the microphone array 114 can be adjusted by shifting the phase of the received audio signals and then adding the audio signals together. Processing the audio signals in this way creates a directional audio pattern such sounds received from some angles are more amplified compared to sounds received from other angles. As used herein, the beam of the microphone array is the direction in which the received audio signal will be amplified the most. The microphones can also be combined to form separate arrays, each array having a different audio pattern. For example, with three microphones A, B, and C, microphones A and B can be used to form a first array, microphones B and C can be used to form a second array, and microphones A and C can be used to form a third array.

Control over the directionality of the microphone array 114 will be determined, at least in part, by the number of microphones and their spatial arrangement on the computing device 100. Sources of sound to which a user may want to aim the beam of the microphone array are referred to herein as beam forming targets. For example, a person speaking may be selected as beam forming target, and the beam of the microphone array 114 may be pointed at the person speaking. By pointing the beam of the microphone at the person speaking, the person's voice will be magnified while background noises originating from different directions will be diminished. In this way, the signal to noise ratio (SNR) can be increased. Beam forming targets can be selected manually by a user of the computing device 100. For example, the user may select a beam forming target by selecting an area of a touch screen display representing an object in the field of view of the camera. In some examples, beam forming targets can be selected automatically by the computing device 100 based on the video data without receiving a selection of the beam forming target from the user.

The facial recognition module 124 enables the computing device 100 to recognize faces in a video signal received by the camera. In some examples, the facial recognition module 124 may identify specific features of a person's face to enable specific people to be identified and tracked as the relative position of different people move through a camera's field of view. The facial recognition module 124 can be used to identify beam forming targets. For example, the facial recognition module 124 can highlight people's faces on the display 118, and a user can select one or more of the highlighted faces as a beam forming target. Highlighting a person's face can include superimposing a box over the user's face or any other technique for drawing attention to a portion of the display. In some examples, the facial recognition target can automatically identify a recognized face as a beam forming target without receiving input from the user.

The image tracking module 126 enables beam forming targets to be tracked as they move through the field of view of the camera. The movement of the object through the field of view of the camera can be due to actual movement of the object relative to the environment, or movement of the camera 116. If an object, such as a person's face, is selected as a beam forming target, the image tracking module can track the position of the object and report the position to the beam former 122. The beam former 122 can use the tracking information to adjust the beam of the microphone array keep the beam aimed at the beam forming target.

The block diagram of FIG. 1 is not intended to indicate that the computing device 100 is to include all of the components shown in FIG. 1. Rather, the computing system 100 can include fewer or additional components not shown in FIG. 1, depending on the details of the specific implementation. Furthermore, any of the functionalities of the CPU 102, the graphics processor 108, or the audio processor 110, may be partially, or entirely, implemented in hardware and/or in a processor. For example, the functionality may be implemented in any combination of Application Specific Integrated Circuit (ASICs), Field Programmable Gate Array (FPGAs), logic circuits, and the like.

Figure 2:
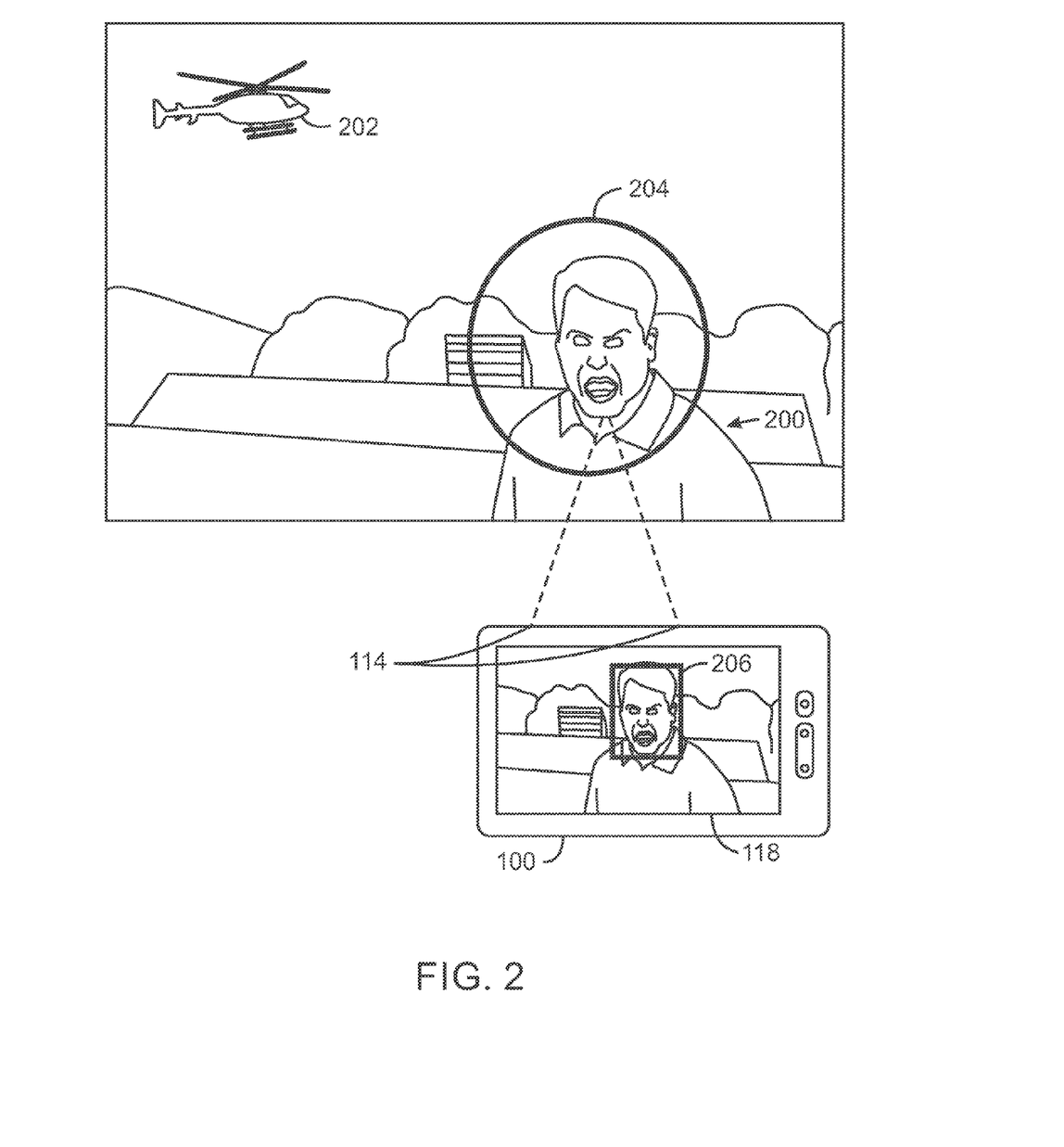
FIG. 2 is an illustration of a computing device that uses audio signal beam forming.

FIG. 2 is an illustration of a computing device that uses audio signal beam forming. As shown in FIG. 2, the computing device 100 is being used to record the voice of a speaker 200 in the presence of loud background noise from a noise source 202. Thus, the speaker 200 has been selected as the beam forming target, which is indicated by the circle 204. In response, the beam former 122 (FIG. 1) adjusts the microphone array 114 to aim the beam of the microphone array 114 at the beam forming target. Focusing the beam at the beam forming target means that sound received in the direction of the beam will be magnified compared to sounds originating from other directions.

In this example, it will be appreciated that the noise from the noise source 202 could be many times louder than the speaker 200. Thus, noise filtering techniques that rely on characteristics of the audio signal, such as sound amplitude, may tend to amplify the background noise rather than the intended audio source. The present techniques use video data captured by the camera 116 and, in some cases, shown on the display 118 to reduce noise through beam forming. By using video data to identify the beam forming target, the correct audio source can be selected as the beam forming target based on the position of the audio source and noise sources despite the other characteristics of the audio signal, such as amplitude.

In some examples, the beam forming target can be selected automatically, based on the image received by the camera. For example, the facial recognition module 124 (FIG. 1) can be used to identify a person's face. In this example, there is only one face identified, as shown by the square 206. The computing device 100 may be configured so that if only one face is detected, that person is selected as the beam forming target. Selecting the beam forming target automatically based on face detection may be a selectable camera setting that can be toggled on and off by the user.

In some examples, the beam forming target may be specified by a user. For example, the user may select any area on the display 118 as the beam forming target by touching the touch screen display 118. In some examples, the user selection of the beam forming target may be assisted by the facial recognition module 124. For example, the facial recognition module 124 may identify and highlight faces as shown in FIG. 2, and the user can select one of more of the identified people as beam forming targets.

The beam former 122 may adjust the beam of the microphone array 114 based on user input. For example, if the user selects a different beam forming target, the beam former 122 may direct the beam at the new beam forming target. In some examples, knowing where the source of the voice is allows the beam forming algorithm to create virtual polar patterns, or even steering the individual pattern lobes of the microphone array to focus at the source so as to minimize and filter out the ambient noise.

Figure 3:
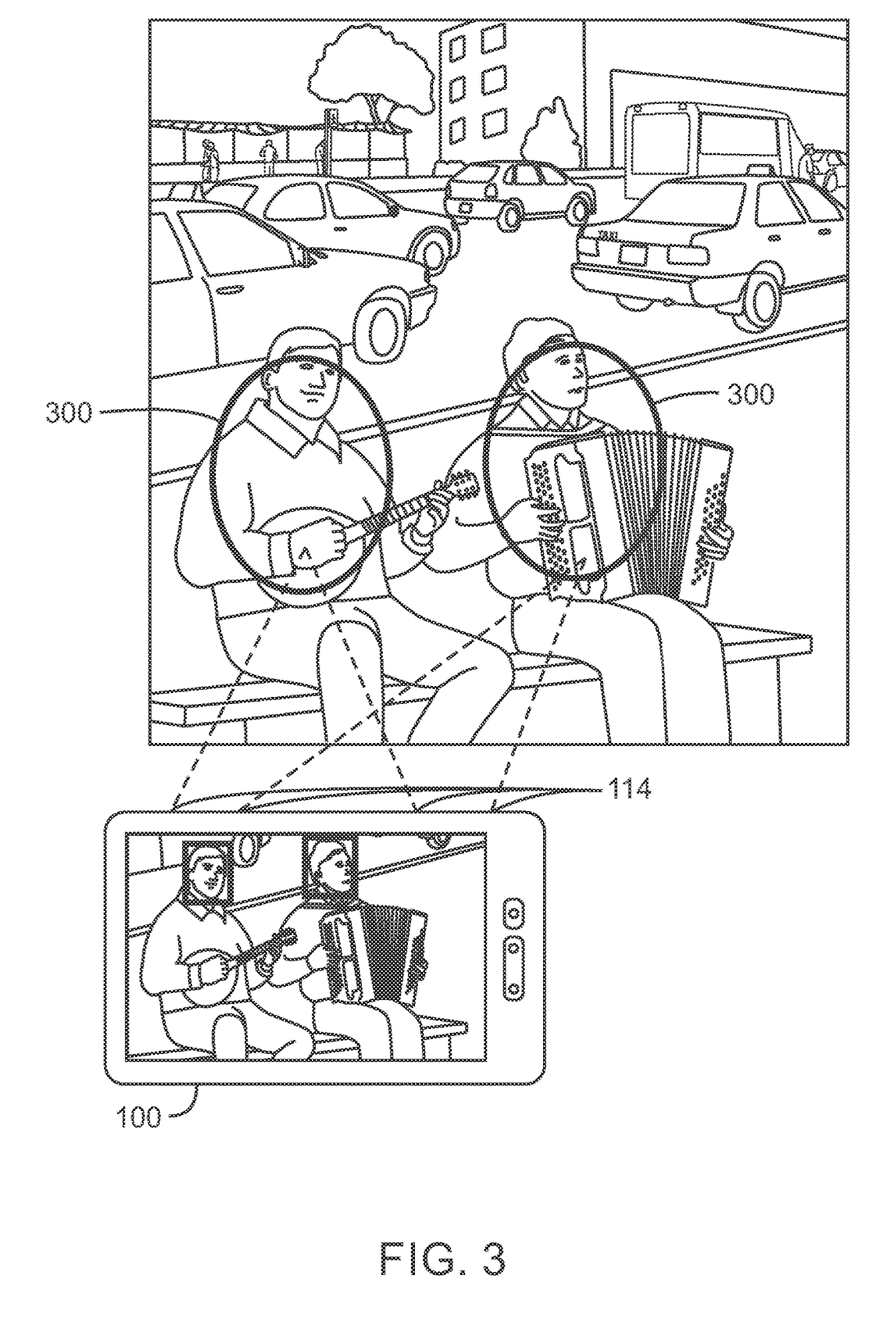
FIG. 3 is an illustration of a computing device using audio signal beam forming.

FIG. 3 is an illustration of a computing device using audio signal beam forming. As shown in FIG. 3, the computing device 100 includes a microphone array 114 that includes four microphones. The additional microphones provide additional versatility in adjusting the directionality of the microphone array 114. For example, once the direction of the audio source is identified, the microphone array algorithm can adjust the audio capture polar pattern and create lobes to enhance the capture of the audio within the lobes. In some examples, the microphones of the microphone array 114 can be combined in different groups to create more than one microphone array 114, resulting in two or more beams with different directionality characteristics. For example, the computing device 100 shown in FIG. 3 includes four microphones grouped to form two microphone arrays 114 with separate beams. Each microphone array 114 is directed at a different beam forming target, in this case, the musicians identified by the circles 300. The four microphones can also be combined as a single microphone array 114 with a single beam. However, in that case, the beam would be more generally directed to both of the desired sound sources and would also include the space between the desired sound sources. Thus, a more generally directed single beam would pick up more noise from the area between the desired sound sources. By generating two beams, each beam can be more focused at the desired sound sources and the background noise can be further reduced.

Although FIG. 3 shows four microphones grouped into two microphone arrays, the computing device 100 can include any suitable number of microphones, which can be grouped in a variety of configurations, depending on the desired directionality characteristics. For example, the computing device 100 could include six microphones grouped to form three microphone arrays. Furthermore, the microphone arrays do not have to have the same number of microphones. For example, if the computing device 100 includes six microphones, the six microphones can be grouped together to form one microphone array with four microphones and one microphone array with two microphones.

The grouping of the microphones and the configuration of the microphone arrays can be determined dynamically by the beam former 122 (FIG. 1), depending on the selected beam forming targets. For example, the number of microphone arrays 114 may be configured to match the number of identified or user-selected beam forming targets.

Figure 4:
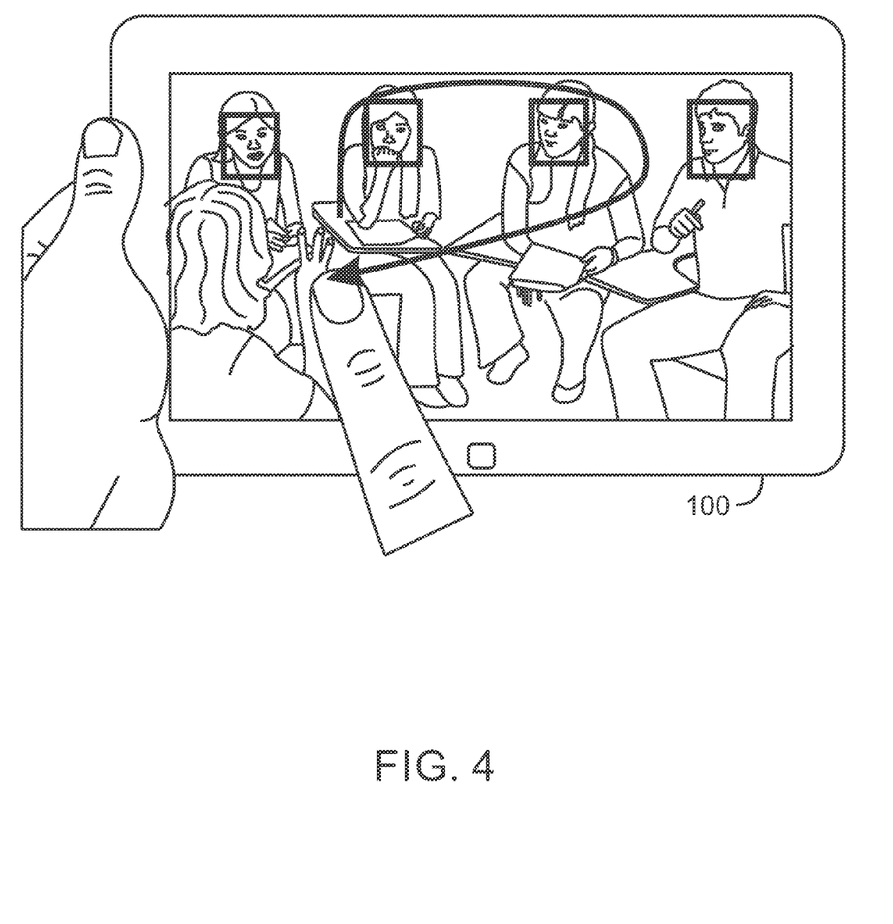
FIG. 4 is a view of a computing device, showing a technique for enabling a user to select beam forming targets.

FIG. 4 is a view of a computing device, showing a technique for enabling a user to select beam forming targets. As shown in FIG. 4, the computing device 100 is being used to record audio/video of a group of speakers. The faces of four of the speakers are surrounded by a box, indicating that the face detection module has identified the four faces in the image. In some examples, the computing device 100 may be configured to wait for a user selection before identifying a beam forming target. For example, the user can select one or more of the faces by touching the corresponding box on the touchscreen. In the example shown in FIG. 4, the user has circled the two middle face boxes as beam forming targets, indicating that the user wants to amplify the voices of those speakers above other speakers and other background noise. As a result of the user's selection, the beam former 122 (FIG. 1) aims the microphone array 114 at the two selected beam forming targets. For example, the beam former 122 may configure the microphone array 114 as a single array with a single beam directed to two targets with wide beam opening angle, or the beam former 122 may configure the microphone array 114 as two arrays with one beam aimed at one beam forming target and the other beam aimed at the other beam forming target.

Figure 5:
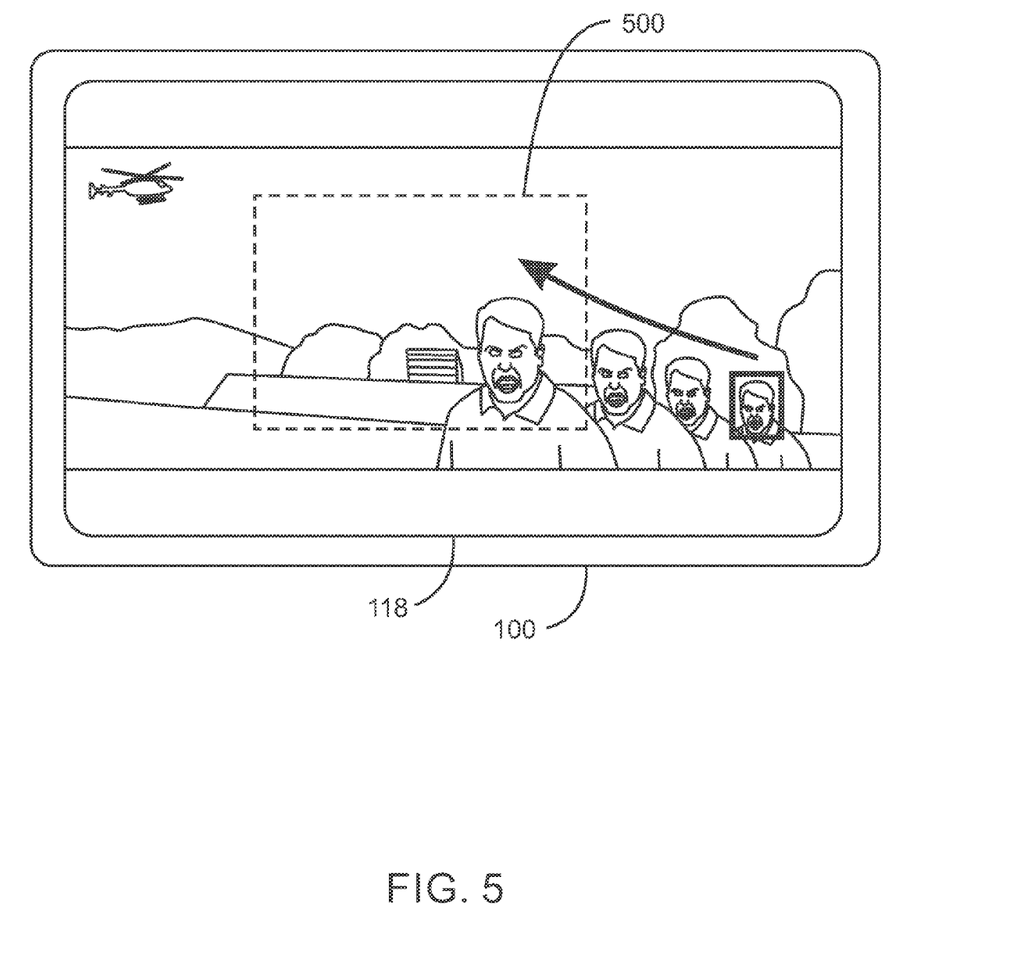
FIG. 5 is a view of a computing device showing another technique for enabling a user to select beam forming targets.

FIG. 5 is a view of a computing device showing another technique for enabling a user to select beam forming targets. More specifically, FIG. 5 shows an example of a technique for enabling a user to select a beam forming target that is out of the video capture window of the computing device 100. As shown in FIG. 5, the display 118 of the video capture device displays the full field of view of the camera or cameras included in the computing device 100. However, only a portion of the field of view is actually recorded. The portion of the field of view that is recorded is referred to as the video capture window 500, which outlines or otherwise highlighted on the display.

Any object or area within the field of view can be selected as a beam forming target. For example, FIG. 5 shows a speaker that is initially positioned outside of the video capture window 500 and moves from outside the video capture window 500 to inside the video capture window 500, creating the impression in the recorded video that the speaker moved from outside of the camera view to inside the camera view. While the speaker is outside of the video capture window 500, the facial recognition module of the computing device can still recognize the face of the speaker. Additionally, the user can select the speaker as a beam forming target. As the speaker moves within the field of view, the beam former can focus the beam of the microphone array at the speaker even if the speaker is not within the video capture window 500.

Figure 6:
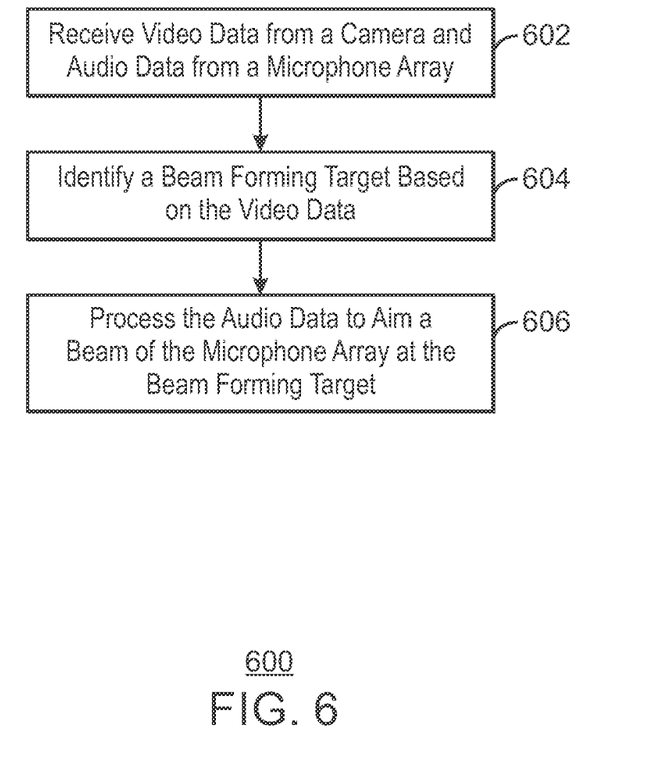
FIG. 6 is a process flow diagram of a method of reducing background noise using audio signal beam forming.
Figure 7:
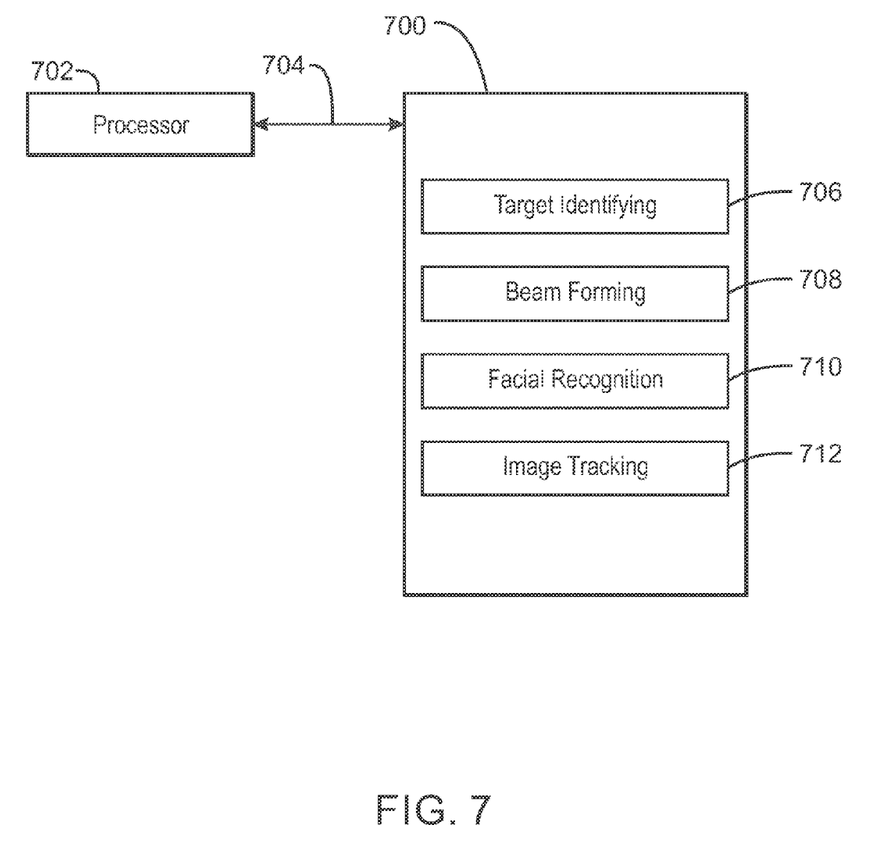
FIG. 7 is a block diagram showing a medium 700 that contains logic for reducing background noise using audio signal beam forming.

FIG. 6 is a process flow diagram of a method of reducing background noise using audio signal beam forming. The method 600 may be performed by the computing device 100 using, for example, one or more of the beam former 122, the facial recognition module 124, and the image tracking module 126, which are shown in FIGS. 1 and 7.

At block 602, video data is received from a camera and audio data is received from a microphone array. In some examples, the video data is displayed on a display, such as a touchscreen of the computing device, thereby enabling a user of the computing device to select one or more beam forming targets. In some examples, the beam forming targets are selected automatically rather than based on a user selection. In such examples, the video data may or may not be sent to the display. So even though the video data is being used to identify a beam-forming target (for example, by facial recognition), the video data does not necessarily have to be displayed.

At block 604, a beam forming target is identified based on the video data. In some examples, the beam forming target is identified by receiving a user selection of the beam forming target. For example, the user may select an object shown on the display of the computing device. The object can be a person's face or any other sound source that the user wants to focus on. Additionally, the user may select any area of the display as a beam forming target even if the user selected area does not include a distinct object or sound source. Furthermore, the user may select more than one beam forming target.

In some examples, the computing device includes facial recognition capability, and identifying the beam forming target may include automatically recognizing a person's face in the video data. The person's face may be automatically selected as the beam forming target without receiving a selection of the beam forming target from a user. If more than one face is detected, one, some, or all of the detected faces may be automatically identified as beam forming targets. In some examples, a person's face may be automatically detected in the video data and highlighted on the display. Identifying a beam forming target may include receiving a user selection of the person's face and, based on the user selection, specifying the person's face as the beam forming target.

At block 604, the audio data is processed to aim one or more beams of the microphone array at the one or more beam forming targets. The location of the beam forming target relative to the camera indicates the angle of the desired beam relative to the microphone array. The desired angle of the beam can be realized by phase shifting the audio signals received from the individual microphones in the microphone array and then summing the audio signals. In cases where two or more beam forming targets are selected, the audio data can be processed to form a suitable number of separate beams each aimed at a separate beam forming target.

In some examples, processing the audio data includes tracking the beam forming target and adjusting the audio processing to keep the beam aimed at the beam forming target. For example, the audio data may be processed according to certain parameters, such as phase shift or amplitude shift parameters, that are applied to the audio data received from each microphone of the microphone array. Certain parameter values may be associated with certain beam characteristics such as beam angle and gain. As the position of the beam forming target moves relative to the camera, the parameters can be adjusted to adjust the beam characteristics.

FIG. 7 is a block diagram showing a medium 700 that contains logic for reducing background noise using audio signal beam forming. The medium 700 may be a computer-readable medium, including a non-transitory medium, that stores code that can be accessed by a processor 702 over a computer bus 704. For example, the computer-readable medium 700 can be volatile or non-volatile data storage device. The medium 700 can also be a logic unit, such as an Application Specific Integrated Circuit (ASIC), a Field Programmable Gate Array (FPGA), or an arrangement of logic gates implemented in one or more integrated circuits, for example.

The medium 700 may include modules 706-712 configured to perform the techniques described herein. For example, a target identifying module 706 may be configured to receive video data and identify a beam forming target based, at least in part, on the video data. A beam forming module 708 may be configured to process audio data to aim a beam of a microphone array at the beam forming target. A facial recognition module 710 may be configured to automatically recognize faces in the video data. An image tracking module 712 may be configured to track the movement of the beam forming target. In some embodiments, the modules 707-712 may be modules of computer code configured to direct the operations of the processor 702.

The block diagram of FIG. 7 is not intended to indicate that the medium 700 is to include all of the components shown in FIG. 7. Further, the medium 700 may include any number of additional components not shown in FIG. 7, depending on the details of the specific implementation.

Some embodiments may be implemented in one or a combination of hardware, firmware, and software. Some embodiments may also be implemented as instructions stored on the tangible, non-transitory, machine-readable medium, which may be read and executed by a computing platform to perform the operations described. In addition, a machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

EXAMPLE 1

An example of a computing device is provided. The example computing device includes a microphone array to receive and generate audio data and a camera. The computing device is to receive video data from the camera and identify a beam forming target based, at least in part, on the video data. The beam former is to process the audio data to aim a beam of the microphone array at the beam forming target.

The computing device can also include a display to display the video data. The computing device to receive a user selection of the beam forming target from the displayed video data. The user selection may be a selection of an object shown on the display. The computing device can also include a motion tracker to track the object, wherein the beam former uses motion tracking information from the motion tracker to adjust the microphone array to keep the beam aimed at the beam forming target. The object may be a person's face. The computing device can include a face detector, wherein the person's face is identified by the face detector and highlighted on the display.

In some examples, the beam forming target is automatically identified by the computing device based on the video data without receiving a selection of the beam forming target from the user. For examples, the computing device can include a face detector to detect a person's face in the video data, and the person's face can be automatically identified by the computing device as the beam forming target.

In some examples, the computing device includes a face detector to detect a person's face in the video data and highlight the person's face on the display, and a user of the computing device can manually select the person's face as the beam forming target. The microphone array can include three or more microphones to generate two or more separate audio beams to be aimed at two or more beam forming targets.

EXAMPLE 2

An example of an apparatus including computer logic is provided. The apparatus includes logic to receive video data from a camera, and logic to identify a beam forming target based, at least in part, on the video data. The apparatus also includes logic to receive audio data from a microphone array and process the audio data to aim a beam of the microphone array at the beam forming target.

The apparatus also includes logic to display the video data and logic to receive a user selection of the beam forming target from the displayed video data. The user selection is a selection of an object shown in the displayed video data.

The apparatus also includes logic to track the object and generate motion tracking information. The logic to process the audio data uses the motion tracking information to keep the beam aimed at the beam forming target. The object can be a person's face for example.

The apparatus also includes logic to automatically identify the person's face. In some examples, the apparatus includes logic to automatically identify the beam forming target based on the video data without receiving a selection of the beam forming target from a user. For example, the apparatus can include logic to detect a person's face in the video data, and the person's face can be automatically selected by the computing device as the beam forming target.

In some examples, the apparatus includes logic to detect a person's face in the video data, highlight the person's face on the display, receive a user selection of the person's face, and, based on the user selection, specify the person's face as the beam forming target. The logic to process the audio data can generate two or more separate audio beams to be aimed at two or more beam forming targets.

EXAMPLE 3

An example of a non-transitory, tangible, computer-readable medium, comprising instructions to direct the actions of a processor is provided. The computer-readable medium includes instructions to direct the processor to receive video data and identify a beam forming target based, at least in part, on the video data. The computer-readable medium also includes instructions to direct the processor to receive audio data from a microphone array and process the audio data to aim a beam of the microphone array at the beam forming target.

The computer-readable medium can also include instructions to direct the processor to display the video data and to receive a user selection of the beam forming target from the displayed video data. The user selection can be a selection of an object shown in the displayed video data.

The computer-readable medium can also include instructions to direct the processor to track the object and generate motion tracking information. The instructions to direct the processor to process the audio data uses the motion tracking information to keep the beam aimed at the beam forming target. The object can be a person's face. The computer-readable medium can also include instructions to direct the processor to automatically identify the person's face.

The computer-readable medium can also include instructions to direct the processor to automatically identify the beam forming target based on the video data without receiving a selection of the beam forming target from the user. For example, the computer-readable medium can include instructions to direct the processor to detect a person's face in the video data, wherein the person's face is automatically selected by the computing device as the beam forming target.

The computer-readable medium can also include instructions to direct the processor to detect a person's face in the video data, highlight the person's face on the display, receive a user selection of the person's face, and, based on the user selection, specify the person's face as the beam forming target. In some examples, the instructions to direct the processor to process the audio data generates two or more separate audio beams to be aimed at two or more beam forming targets.

EXAMPLE 4

An example of a method is provided. The method includes receiving video data from a camera, and identifying a beam forming target based, at least in part, on the video data. The method also includes receiving audio data from a microphone array and processing the audio data to aim a beam of the microphone array at the beam forming target.

The method also includes displaying the video data and receiving a user selection of the beam forming target from the displayed video data. The user selection is a selection of an object shown in the displayed video data.

The method also includes tracking the object and generating motion tracking information. Processing the audio data can include using the motion tracking information to keep the beam aimed at the beam forming target. The object can be a person's face for example.

The method also includes automatically identifying the person's face. In some examples, the method includes automatically identifying the beam forming target based on the video data without receiving a selection of the beam forming target from a user. For example, the method can include detecting a person's face in the video data, and automatically selecting the person's face by the computing device as the beam forming target.

In some examples, the method includes detecting a person's face in the video data, highlighting the person's face on the display, receiving a user selection of the person's face, and, based on the user selection, specifying the person's face as the beam forming target. Processing the audio data can include generating two or more separate audio beams to be aimed at two or more beam forming targets.

EXAMPLE 5

An example of an apparatus is provided. The apparatus includes means for receiving video data from a camera, and means for identifying a beam forming target based, at least in part, on the video data. The apparatus also includes means for receiving audio data from a microphone array and means for processing the audio data to aim a beam of the microphone array at the beam forming target.

The apparatus also includes means for displaying the video data and means for receiving a user selection of the beam forming target from the displayed video data. The user selection is a selection of an object shown in the displayed video data.

The apparatus also includes means for tracking the object and generating motion tracking information. Processing the audio data can include using the motion tracking information to keep the beam aimed at the beam forming target. The object can be a person's face for example.

The apparatus also includes means for automatically identifying the person's face. In some examples, the apparatus includes means for automatically identifying the beam forming target based on the video data without receiving a selection of the beam forming target from a user. For example, the apparatus can include means for detecting a person's face in the video data, and automatically selecting the person's face by the computing device as the beam forming target.

In some examples, the apparatus includes means for detecting a person's face in the video data, means for highlighting the person's face on the display, means for receiving a user selection of the person's face, and, based on the user selection, specifying the person's face as the beam forming target. Processing the audio data can include generating two or more separate audio beams to be aimed at two or more beam forming targets.

What is claimed is:

1. A computing device, comprising:
a microphone array to receive and generate audio data;
a camera, wherein the computing device is to receive video data from the camera and identify a beam forming target based, at least in part, on the video data;
a display to display the video data, wherein the computing device is to receive a user selection of the beam forming target from the displayed video data by user selection of an object from the display; and
a beam former to process the audio data to aim a beam of the microphone array at the beam forming target.

2. The computing device of claim 1, comprising a motion tracker to track the object, wherein the beam former uses motion tracking information from the motion tracker to adjust the microphone array to keep the beam aimed at the beam forming target.

3. The computing device of claim 1, wherein the object is a person's face.

4. The computing device of claim 3, comprising a face detector, wherein the person's face is identified by the face detector and highlighted on the display.

5. The computing device of claim 1, wherein the beam forming target is automatically identified by the computing device based on the video data without receiving a selection of the beam forming target from the user.

6. The computing device of claim 1, comprising a face detector to detect a person's face in the video data, wherein the person's face is automatically identified by the computing device as the beam forming target.

7. The computing device of claim 1, comprising a face detector to detect a person's face in the video data and highlight the person's face on the display, wherein a user of the computing device can manually select the person's face as the beam forming target.

8. The computing device of claim 1, wherein the microphone array includes three or more microphones to generate two or more separate audio beams to be aimed at two or more beam forming targets.

9. An apparatus, comprising:
logic to receive video data from a camera;
logic to display the video data;
logic to identify a beam forming target based, at least in part, on the video data by receiving a user selection of the beam forming target from the displayed video data, wherein the user selection is a selection of an object from the displayed video data; and
logic to receive audio data from a microphone array and process the audio data to aim a beam of the microphone array at the beam forming target.

10. The apparatus of claim 9, comprising logic to track the object and generate motion tracking information, wherein the logic to process the audio data uses the motion tracking information to keep the beam aimed at the beam forming target.

11. The apparatus of claim 9, wherein the object is a person's face, the apparatus comprising logic to automatically identify the person's face.

12. The apparatus of claim 9, comprising logic to detect a person's face in the video data, wherein the person's face is automatically selected by the computing device as the beam forming target.

13. The apparatus of claim 9, comprising logic to detect a person's face in the video data, highlight the person's face on the display, receive a user selection of the person's face, and, based on the user selection, specify the person's face as the beam forming target.

14. A non-transitory computer-readable medium, comprising instructions to direct a processor to:
receive video data;

send the video data to a display;
identify a beam forming target based, at least in part, on the video data by receiving a user selection of the beam forming target from the displayed video data, wherein the user selection is a selection of an object from the displayed video data; and
receive audio data from a microphone array and process the audio data to aim a beam of the microphone array at the beam forming target.

15. The non-transitory computer-readable medium of claim 14, comprising instructions to direct the processor to track the object and generate motion tracking information, wherein the instructions to direct the processor to process the audio data uses the motion tracking information to keep the beam aimed at the beam forming target.

16. The non-transitory computer-readable medium of claim 14, wherein the object is a person's face.

17. The non-transitory computer-readable medium of claim 16, comprising instructions to direct the processor to automatically identify the person's face.

18. The non-transitory computer-readable medium of claim 14, comprising instructions to direct the processor to automatically identify the beam forming target based on the video data without receiving a selection of the beam forming target from the user.

19. The non-transitory computer-readable medium of claim 14, comprising instructions to direct the processor to detect a person's face in the video data, wherein the person's face is automatically selected by the computing device as the beam forming target.

20. The non-transitory computer-readable medium of claim 14, comprising instructions to direct the processor to detect a person's face in the video data, highlight the person's face on the display, receive a user selection of the person's face, and, based on the user selection, specify the person's face as the beam forming target.

21. The non-transitory computer-readable medium of claim 14, wherein the instructions to direct the processor to process the audio data generates two or more separate audio beams to be aimed at two or more beam forming targets.

* * * * *